United States Patent [19]

Kuhn, Jr.

[11] 4,187,595
[45] Feb. 12, 1980

[54] METHOD OF FABRICATING NOZZLE BLADES FOR LASERS

[75] Inventor: Ralph F. Kuhn, Jr., Calabasas, Calif.

[73] Assignee: The United States of Amrica as represented by the Secretary of the Air Force, Washington, D.C.

[21] Appl. No.: 941,718

[22] Filed: Sep. 12, 1978

[51] Int. Cl.² ............................................. B23P 15/00
[52] U.S. Cl. .................................... 29/157 C; 29/424; 204/9; 331/94.5 D; 331/94.5 G
[58] Field of Search ..................... 29/157 C, 423, 424, 29/DIG. 26; 204/9; 331/94.5 G, 94.5 D, 94.5 C; 239/553.5; 415/83, 80; 219/69 M

[56] References Cited

U.S. PATENT DOCUMENTS

| | | | |
|---|---|---|---|
| 1,634,274 | 7/1927 | Smith | 29/157 C |
| 1,646,602 | 10/1927 | Smith | 29/157 C |
| 2,641,439 | 6/1953 | Williams | 29/424 |
| 2,930,115 | 3/1960 | Dietzsch, Sr. et al. | 29/423 |
| 3,230,613 | 1/1966 | Rechin et al. | 29/157 C |
| 3,882,416 | 5/1975 | Borghi et al. | 331/94.5 G |
| 3,981,786 | 9/1976 | Andrews | 219/69 M |
| 3,986,138 | 10/1976 | Neal | 331/94.5 D |
| 3,991,384 | 11/1976 | Betts | 331/94.5 G |

Primary Examiner—Daniel C. Crane
Attorney, Agent, or Firm—Joseph E. Rusz; Jacob N. Erlich

[57] ABSTRACT

A method of fabricating nozzle blades for lasers in which the blade core is formed from an annular-shaped, rigid, chemically resistant material having a pair of opposed circular grooves machined therein. An open-ended exit nozzle is formed in the outer diameter of the core. The coolant channels, injection manifolds and trip manifolds are formed by electrodepositing a chemically resistant material around the core after the core has a plurality of cutouts formed therein. Final nozzle blade configuration takes place after the electrodepositing operation is completed.

1 Claim, 12 Drawing Figures

METHOD OF FABRICATING NOZZLE BLADES FOR LASERS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to lasers, and, more particularly to a method of fabricating nozzle blades for use within cylindrical lasers.

The development of the laser has created a new area of technology which finds application in many systems already in existance today. For example, lasers can be found in the area of optical communications, holography, medicine, cutting, calculating and in radar. The utilization of the laser in such areas is in many instances dependent upon the amplification of the existing laser radiation.

In certain areas, such as in optical communications or optical radar, it is necessary to greatly amplify the initial radiation power produced by the laser. One laser which produces a high output power is the cylindrical chemical laser. In such a laser, or in most conventional lasers, the "optical or resonant cavity" of the laser typically comprises plane parallel or curved mirrors located at right angle to the axis of the cylindrical region. The cylindrical region may be a gas envelope or the like in which the laser action takes place. For laser operation, one of the mirrors is required to be partially transmissive in order to extract a useful beam coherent light from the "optical cavity".

One problem which exists in the cylindrical lasers is that the nozzle blade must operate at a temperature greater than the centerbody manifold assembly on which the nozzle blades are mounted and from which they are fed. This problem has been overcome by the baffle/nozzle array set forth in U.S. patent application Ser. No. 926,471, filed July 20, 1978 entitled Baffle/Nozzle Array for Cylindrical Lasers by the same inventor as the instant application.

The most complex and critical component from a fabrication standpoint is the nozzle blade itself. The design requirements especially for a hoop blade as utilized in the baffle/nozzle array described in the above mentioned patent application in terms of complexity and dimensional tolerances not only precludes the use of many fabricating methods of the past but also adds several new and unique requirements. In the past, the short straight blades for lasers have been made by machining these blades from metal bars and plate stock in lathes, drills, mills and electric discharge machines. Attempts have been made to investment cast, extrude and so-called "injection mold" laser blades. These methods, however, cannot be used along without further joining and machining to provide coolant passages all around the nozzle blade in a complete circular blade as utilized within cylindrical lasers since the nozzle blades for cylindrical lasers are characterized by a large diameter-to-cross-section ratio, tight tolerances, and large numbers of small holes and internal passages.

SUMMARY OF THE INVENTION

The instant invention overcomes the problems encountered in the past and as set forth in detail hereinabove by providing a method of fabricating nozzle blades for cylindrical lasers which not only meet all the requirements set forth in conventional nozzle blade fabrication but also accurately produce the cavity fuel subsonic feed passages and manifolds which are key requirements in the nozzle blade fabrication sequence.

The method of this invention which is utilized for fabricating the nozzle blades utilized in circular or cylindrical lasers is made up of initially forming the blade core by machining circular grooves around an annular piece of stock on both the top and bottom surfaces thereof. An open exit nozzle is then machined on the outside diameter of the core. The exit nozzle is then spun down or rolled down or pressed down to bring the exit nozzle to its final internal contour. Internal nozzle passages are now formed on the core. Cover caps are applied on the top and bottom of the core to close out the manifolding of the blade. This closure can be formed by electroforming nickel caps thereon, however, these caps could be applied by other means such as brazing. The outside nozzle contour is machined onto the blade to form the final configuration. Although this invention generally resides in the fabrication of laser cavity nozzle blades for high power cylindrical lasers, it should be realized that the method set forth in the instant application also applies to the manufacture of nozzle blades for any type of laser.

It is therefore an object of this invention to provide a method of fabricating nozzle blades for cylindrical lasers.

It is another object of this invention to provide a method of fabricating nozzle blades for lasers which require a continuous cavity fuel nozzle.

It is still another object of this invention to provide a method of fabricating nozzle blades for lasers in which the fabricated nozzle blade meets all laser design requirements.

It is a further object of this invention to provide a method of fabricating nozzle blades for lasers which is economical and which utilizes conventional, currently available manufacturing apparatus.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

DETAILED DESCRIPTION OF THE PREFERRED METHOD

Figure 7:
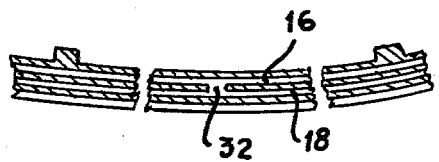
FIG. 7 is a cross-sectional view taken along line VI—VI of FIG. 6 showing the mid-span cross feed locations formed by the method of this invention of fabricating the nozzle blades for cylindrical lasers.
Figure 12:
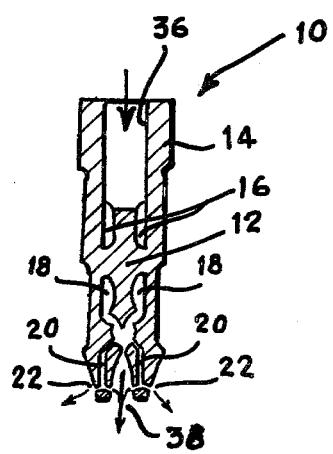
FIG. 12 is a cross-sectional view showing the completed nozzle blade formed by the method of this invention of fabricating the nozzle blades for cylindrical lasers.

The nozzle blades 10 fabricated by the method of this invention are of a continuous-hoop design so as to provide as near as possible a circumferential homogeneous lasing medium to the optical cavity of a cylindrical laser. As best illustrated in FIG. 12 of the drawing nozzle blade 10 is made with a core 12 of any suitable rigid chemically resistant material such as Inconel 625 and an electrodeposited nickel closure 14. Blades 10 are fully regeneratively cooled. Two coolant channels 16 per blade 10 are located near the leading edge thereof. Cavity fuel passes from the baffles of a cylindrical laser (not shown) into channels 16. From channels 16 the fuel passes half way across the blade span as illustrated in FIG. 7 of the drawing, then into the injection manifold 18 of blade 10 and into two trip-manifolds 20 and out trip-holes 22.

Figure 1:
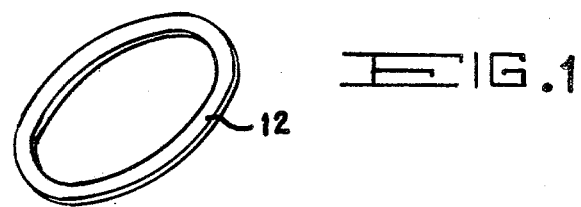
FIG. 1 is a pictorial representation of the cylindrically or annular-shaped stock utilized in the method of this invention of fabricating nozzle blades for cylindrical lasers.
Figure 2:
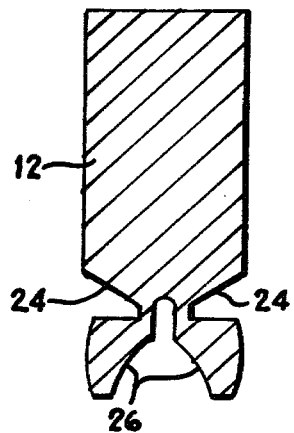
FIG. 2 is a cross-sectional view of the nozzle blade core having the exit nozzle machined therein by the method of this invention of fabricating nozzle blades for cylindrical lasers.

Since nozzle blades 10 are characterized by a large diameter-to-cross-section ratio, tight tolerances, and a large number of small holes and internal passages their fabrication becomes an essential operation in the entire manufacturing procedure of cylindrical lasers. The fabrication process of the instant invention begins by the forming of a cylindrical or annular-shaped blade core 12 as shown in FIG. 1 of the drawing. FIG. 2 illustrates the formation in core 12 of circular grooves 24 circumferentially located around blade 10 on both the top and bottom surfaces thereof. An open-ended exit nozzle 26 is now machined on the outside diameter of the core blank 12.

Figure 3:
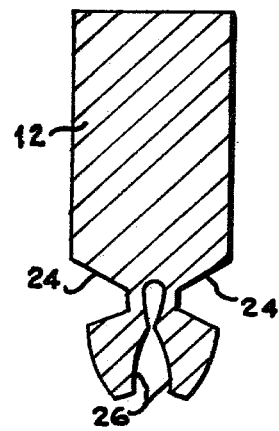
FIG. 3 is a cross-sectional view of the nozzle blade core in which the nozzle throat has been closed by the method of this invention of fabricating nozzle blades for cylindrical lasers.
Figure 4:
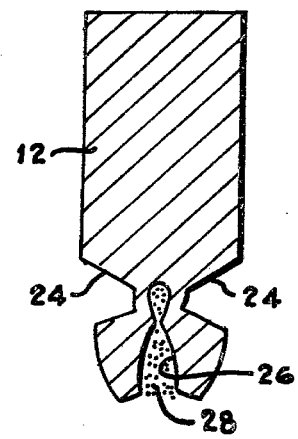
FIG. 4 is a cross-sectional view of the nozzle blade core illustrating the wax located within the throat during the method of this invention of fabricating nozzle blades for cylindrical lasers.

In order to properly form the nozzle 26 of blade 10 the exit nozzle 26 is spun down or rolled down or pressed down as shown in its final configuration in FIG. 3 of the drawing to bring exit nozzle 26 to its final internal contour. FIG. 4 illustrates the placing of any suitable chemically resistant material 28 such as wax and calcium carbonate within nozzle section 26 in order to keep the nozzle 26 stiff and prevent deflection thereof during the turning down or machining procedure illustrated in FIG. 5 of the drawing. In addition wax is utilized since its low melting point allows it to melt out at approximately 200° F.

Figure 5:
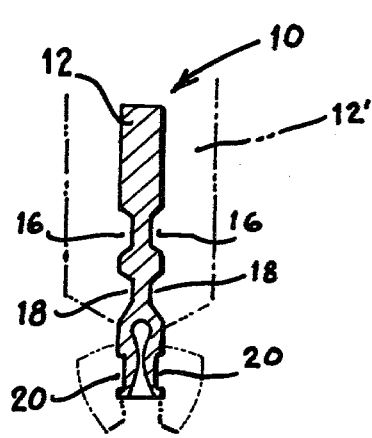
FIG. 5 is a cross-sectional view showing the final thickness and internal passages of the nozzle blade core produced by the method of this invention of fabricating nozzle blades for cylindrical lasers.

The completed core 12 of blade 10 is shown in FIG. 5 of the drawing wherein the previous external configuration 12' is shown in phantom. The machining procedure of this step of the method of this invention forms within core 12 pairs of cutout portions 16, 18 and 20, respectively. These cutout portions are later utilized in conjunction with an electrodeposited nickel closure to form the coolant channels, injection manifolds and trip manifolds, respectively.

Figure 6:
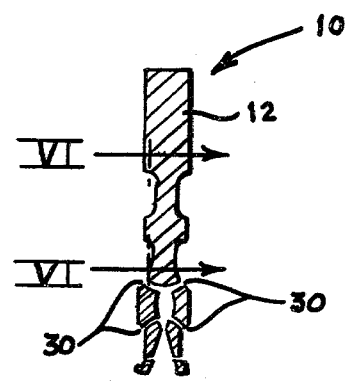
FIG. 6 is a cross-sectional view of the nozzle blade core showing the trip holes therein formed by the method of this invention of fabricating nozzle blades for cylindrical lasers.

FIG. 6 of the drawing illustrates core 12 having electrical discharge machined holes 30 formed therein in order to complete the manifolding of core 12 for proper fuel flow within nozzle 10. After the completion of the electrical discharge machining operation, FIG. 7 illustrates in a cross-sectional representation the electrical discharge machining of a plurality of mid-span cross-feed apertures 32. These apertures 32 formed between cutout portions 16 and 18 allow the flow of fuel half way across the span of nozzle blade 10 and then into the injection manifold 18.

Figure 8:
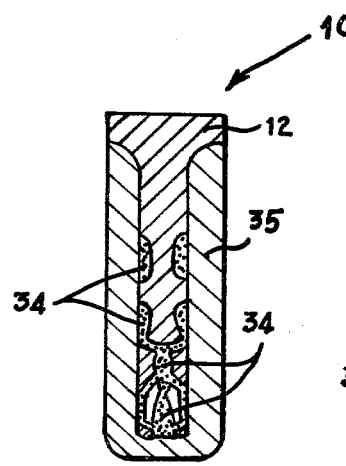
FIG. 8 is a cross-sectional view of the nozzle blade core having nickel closures formed therearound by the method of this invention by fabricating nozzle blades for cylindrical lasers.
Figure 9:
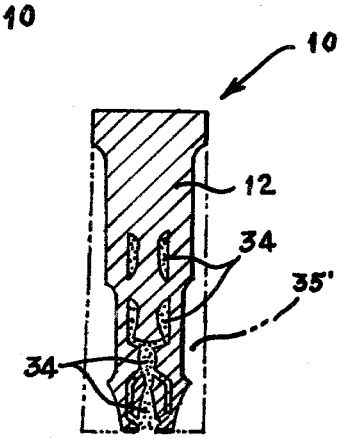
FIG. 9 is a cross-sectional view of the nozzle blade having its exterior contour formed by the method of this invention of fabricating nozzle blades for cylindrical lasers.
Figure 10:
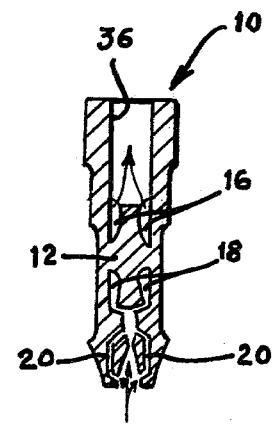
FIG. 10 is a cross-sectional view of the nozzle blade having the steps of baffle feed hole formed therein by the method of this invention of fabricating the nozzle blades for cylindrical lasers.

FIG. 8 of the drawing clearly shows the location of wax 34 within the cutout portions of core 12 and the subsequent electrodepositing of a closure 35 utilizing any suitable material such as nickel about core 12 in order to form the completed blade structure 10. Further machining of nozzle blade 10 results in the final nozzle blade configuration shown in FIG. 9 of the drawing in which the non-machined portion of blade 10 is shown in phantom by the numeral 35'. All wax 34 is now removed from nozzle blade 10 as illustrated in FIG. 10 of the drawing. A flushing fluid is now passed through blade 10 in order to remove any wax which still remains after a melting procedure. In addition, FIG. 10 shows the location of baffle feed hole 36 machined into core 12 in order to allow fuel to flow through nozzle blade 10.

Figure 11:
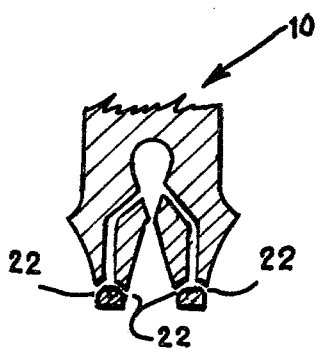
FIG. 11 is a segmented cross-sectional view of the nozzle blade having the outer trip holes formed therein by the method of this invention of fabricating the nozzle blades for cylindrical lasers.

The remaining trip-holes 22 are now formed within the nozzle blade 10 as shown in FIG. 11 of the drawing by an electrical discharge machining operation. The completed nozzle blade 10 is clearly shown in FIG. 12 of the drawing wherein arrows 38 are utilized to show the direction and passing through of blades 10 of fuel during its operation. The fabrication procedure set forth hereinabove allows for the utilization of nozzle blade 10 in injectors of high power lasers. Heretofore the construction of laser nozzle blades were limited to straight nozzle blades, the straight nozzle blades being incompatible with use within cylindrical lasers.

Although this invention has been described with reference to a particular method, it will be understood that this invention is also capable of further and other steps within the spirit and scope of the appended claims.

I claim:

1. A method of fabricating nozzle blades for lasers comprising the following steps:
   (a) forming an annular-shaped blade core of a rigid, chemically resistant material,
   (b) forming a pair of opposed circumferentially located grooves in said annular-shaped core,
   (c) machining an open-ended exit nozzle on the outside diameter of said core intermediate said grooves,
   (d) pressing said exit nozzle into its final configuration;

(e) placing a chemically resistant, nonconductive, low melting point material within said exit nozzle,
(f) machining a plurality of pairs of cutout portions within said core,
(g) electric discharge machining a first set of passageways within said core adjacent said cutout portions in order to interconnect said cutout portions,
(h) placing a chemically resistant, nonconductive, low melting point material within said cutout portions and said first set of passageways,
(i) electrodepositing said core with a closure of chemically resistant material,
(j) removing said chemically resistant, nonconductive, low melting point material from said cutout portions, said first set of passageways and said exit nozzle, thereby forming the coolant channels, injection manifolds and trip manifolds of said nozzle,
(k) electric discharge machining a centrally located feed hole within said core opposite said exit nozzle, said feed hole being operably connected to said coolant channels, injection manifolds and trip manifolds, and
(l) electric discharge machining a second set of passageways in said closure adjacent said exit nozzle, thereby forming additional trip manifolds.

* * * * *